W. H. COTTON AND C. H. KEHM.
VENT FOR STEAM RADIATORS.
APPLICATION FILED NOV. 12, 1919.

1,365,768.

Patented Jan. 18, 1921.

Inventors:
Walter H. Cotton
Clarence H. Kehm
By
Attys.

UNITED STATES PATENT OFFICE.

WALTER H. COTTON AND CLARENCE H. KEHM, OF CHICAGO, ILLINOIS.

VENT FOR STEAM-RADIATORS.

1,365,768. Specification of Letters Patent. Patented Jan. 18, 1921.

Application filed November 12, 1919. Serial No. 337,587.

*To all whom it may concern:*

Be it known that we, WALTER H. COTTON and CLARENCE H. KEHM, citizens of the United States, and residents of Chicago, county of Cook, and State of Illinois, have invented certain new and useful Improvements in Vents for Steam-Radiators, of which the following is a specification and which are illustrated in the accompanying drawings, forming a part thereof.

This invention relates to vents for steam radiators, and has as an object the provision of a device that may be used to replace the usual valve supplied to permit escape of air from the radiator, and which will permit a constant small noiseless escape of steam and prevent the escape of water.

An illustrative embodiment of the invention is shown in the accompanying drawings, in which—

Figures 1, 2:
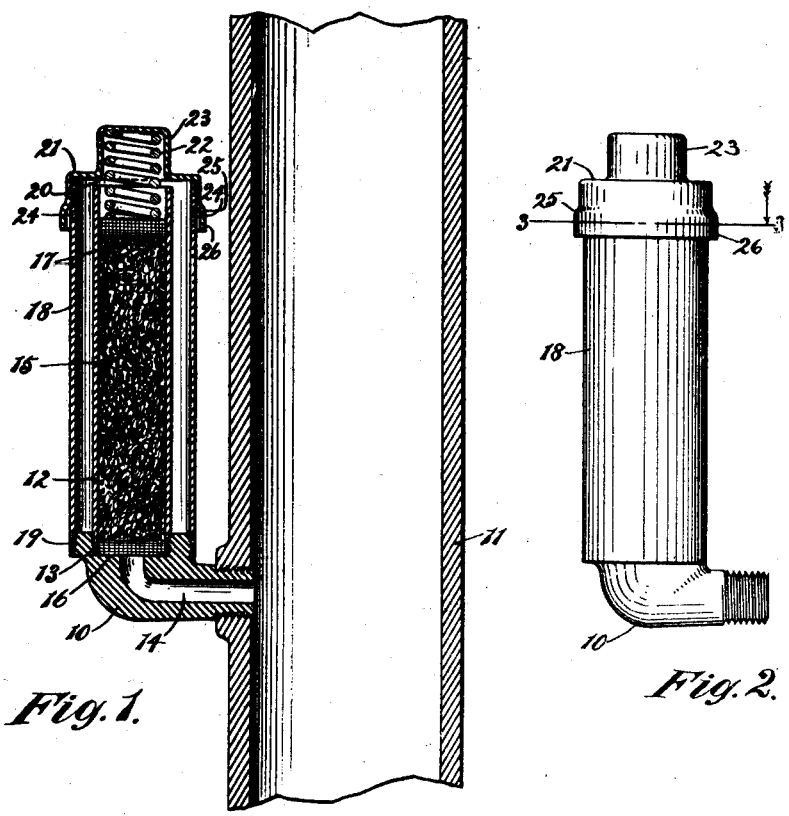
Figure 1 is a central vertical section through a device embodying the invention, showing a fragment of a radiator in section.
Fig. 2 is a side elevation of the vent device shown in Fig. 1.
Figure 3:
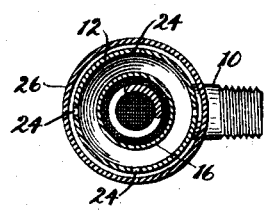
Fig. 3 is a horizontal section on line 3—3 of Fig. 2.

As shown the vent is provided at its lower portion with an elbow, as 10, adapted to screw into a steam radiator, as 11, in lieu of the usual automatic valve.

To check the flow of steam and prevent escape of water a cylinder 12 is shown as screwed into a depression 13 in elbow 10, over the opening of the passage 14 in said elbow. The interior of the cylinder 12 may be filled with suitable absorbent material 15, as cotton or gauze. Preferably a screen, as 16, 17, formed of some non-corrodible material, as copper, is placed in the cylinder 12 above and below the absorbent material 15.

An outer casing for the device is shown as comprising a cylinder 18, surrounding cylinder 12, and spaced away from the walls thereof, being screwed to the upper end of the elbow 10, as at 19. Cylinder 18 is shown as projecting upwardly beyond cylinder 12, thus providing a passage, as 20, above cylinder 12, and as having an interiorly screw-threaded cap 21 engaging and covering its upper end.

To retain the absorbent material in the cylinder 12 against the steam pressure, a coiled spring 22 is shown seated upon screen 17 and within a cavity in cap 21, provided by an upwardly extended portion 23 of the cap, which portion is shown as having an internal diameter substantially equal to the inner diameter of cylinder 12.

To permit the final escape of steam from the device a plurality of ports 24, four being shown, may be formed in the walls of cylinder 18. As shown, the cap 21 is enlarged at its lower portion below its screw-threads, as at 25, the skirting 26 provided by said enlargement standing away from the outer wall of cylinder 18, and forming an effectual shield for the openings 24. The provision of this shield insures the downward direction of escaping steam or air and will tend to prevent soiling of wall decorations.

When the steam is first turned into the radiator the contained air will be readily forced through the absorbent material in cylinder 12. If the material is wet the air will serve to dry the material to some extent, taking the moisture with it. When steam begins to pass through the absorbent material it will be condensed sufficiently to moisten the material to the point where the molecular attraction of the material for the moisture is greater than the steam pressure. By conduction the cylinder 12 will be heated from the radiator and the moisture near the walls of this cylinder will be evaporated, allowing a constant slow noiseless escape of steam which will keep the radiator constantly hot and will, to a certain extent, moisten the air in the room.

The absorbent material may be very readily renewed.

In the event of escape of water over the top of cylinder 12 it will be retained in the space between the cylinders 12 and 18 and will be gradually evaporated therefrom. The cylinder 18 aids in keeping cylinder 12 hot enough to efficiently evaporate some of the moisture in the outer portions of the body of absorbent material.

We claim as our invention—

1. In a radiator vent, in combination, a hollow body adapted to be placed in direct communication with the interior of a radiator, a filling of absorbent material in said body, a retaining screen at each side of the filling, and means to retain the outer screen and the filling in place, comprising a cap for said hollow body and a spring reacting between said cap and said screen.

2. In a radiator vent, in combination, a plurality of cylinders nested together with their walls spaced apart, the interior of the inner cylinder being adapted to be placed in direct communication with the interior of the radiator, the interior of the several cylinders being in communication at their upper portions, a filling of absorbent material for the inner cylinder, the outer cylinder having an outlet.

3. In a radiator vent, in combination, a plurality of nested cylinders having their several interiors in communication and their walls spaced apart, the interior of the inner cylinder being adapted to be placed in direct communication with the interior of a radiator, a filling of absorbent material in the inner cylinder, a cap on the outer cylinder, a skirting on said cap standing in spaced relation to the wall of the outer cylinder, said wall having vent openings behind said skirting.

4. A radiator vent comprising, in combination, a plurality of cylinders nested together, one of said cylinders being adapted to be placed in direct communication with the interior of a radiator and being provided with a filling of absorbent material, said cylinders being open at the top, a cap engaging only the outer of said cylinders whereby the interior of the cylinders are in communication at their tops and a vent for said interiors.

5. A radiator vent comprising, in combination, a pair of concentric cylinders open at the top, one of said cylinders being adapted to be placed in direct communication with the interior of a radiator and having a filling of absorbent material, a cap for the outer of said cylinders being out of engagement with the inner cylinder whereby the interior of said cylinders are in free communication and a vent for said interiors.

6. A vent for radiators comprising, in combination, a pair of concentric cylinders having their walls spaced apart, a filling of absorbent material in the inner of said cylinder, the interior of said inner cylinder being adapted to be placed in direct communication with the interior of a radiator, the inner cylinder open at the top, a screen retaining the absorbent material in place, a cap for said outer cylinder, a spring compressed between said screen and cap, the upper portion of said outer cylinder having a vent.

WALTER H. COTTON.
CLARENCE H. KEHM.